UNITED STATES PATENT OFFICE.

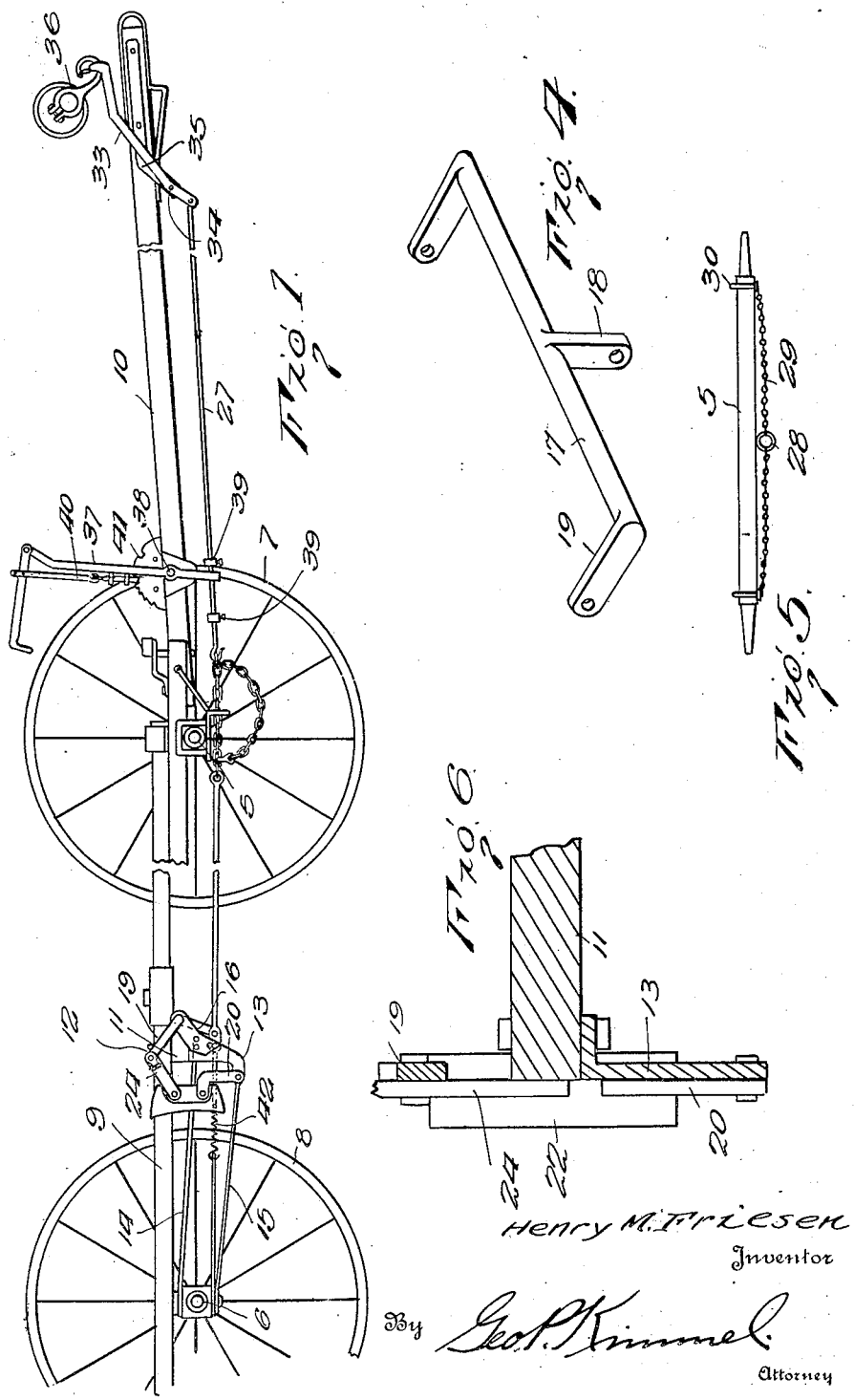

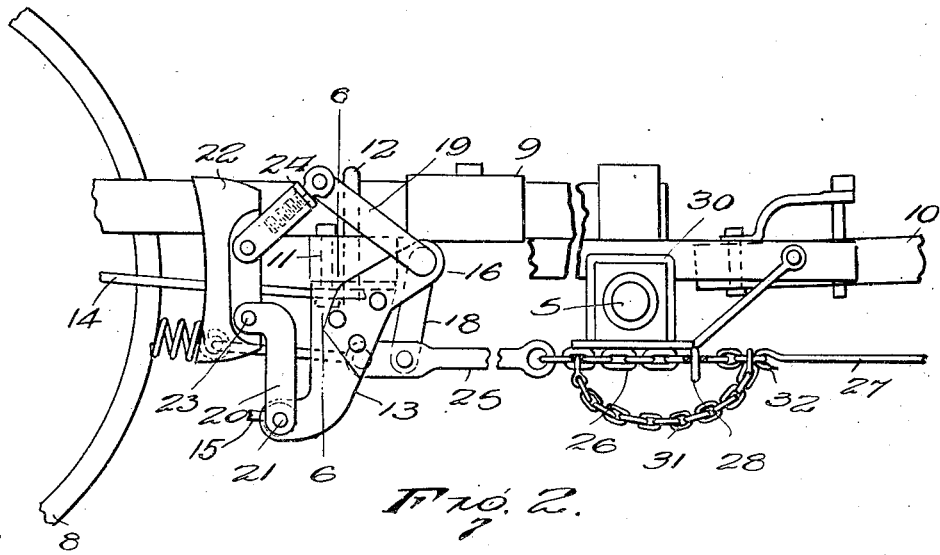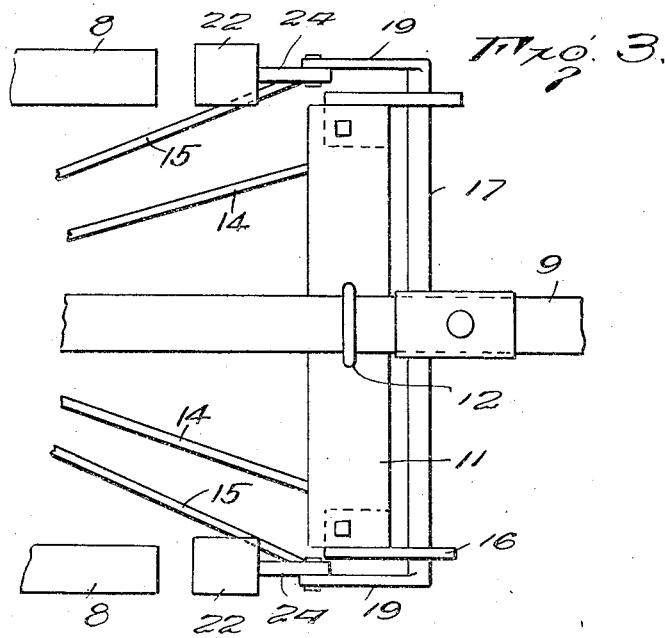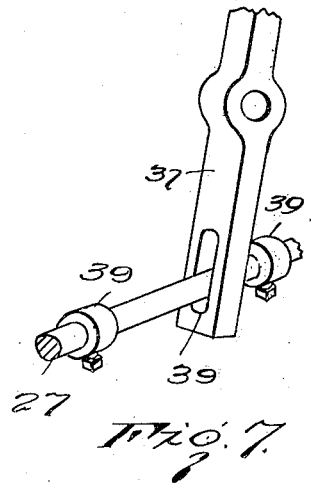

HENRY M. FRIESEN, OF RUSH LAKE, SASKATCHEWAN, CANADA.

WAGON-BRAKE.

1,359,350.

Specification of Letters Patent.   Patented Nov. 16, 1920.

Application filed April 22, 1919. Serial No. 291,976.

*To all whom it may concern:*

Be it known that I, HENRY M. FRIESEN, a subject of the King of England, residing at Rush Lake, in the Province of Saskatchewan, Canada, have invented certain new and useful Improvements in Wagon-Brakes, of which the following is a specification.

This invention relates to vehicle brakes and has for its primary object to provide a brake and suitable mechanism associated therewith whereby the load is utilized to apply the brake shoes to the wheels and thus retard the travel of the vehicle to the proper extent.

Another object is the provision of a novel construction and arrangement of the brake shoe supporting and actuating links whereby a wedging effect is produced during the application of the shoes to increase the pressure exerted upon the wheels and effectively retard movement.

Another object of the invention is the application of a hand lever to the brake actuating mechanism whereby the brake may be manually controlled independently of the automatic setting means and further the actuating means may be locked against operation to prevent application of the brakes while backing the vehicle.

With the above and other objects as will appear as the description proceeds, the invention comprises the novel features of construction, combination of elements and arrangements which will be more fully described hereinafter and set forth with particularity in the claims appended hereto.

In the drawings:

Figure 1 represents a fragmentary side elevation of a vehicle, partly in section, showing the invention applied to use, Fig. 2 represents an enlarged fragmentary side elevation of the body of the vehicle showing a portion of the improved brake, Fig. 3 represents a fragmentary plan view of the vehicle and brake, Fig. 4 represents a perspective view of the brake actuating crank detached, Fig. 5 represents a front elevation of the front axle illustrating the guide for the draw chain in detail, Fig. 6 represents a detail sectional view in the plane of the section line 6—6 of Fig. 2, and Fig. 7 represents a fragmentary perspective view of the hand operated lever and its connection with the pull rod of the brake mechanism.

Referring to the drawings in detail, wherein similar reference numerals designate corresponding parts throughout the several views, the numerals 5 and 6 indicate front and rear axles respectively of a preferred type of vehicle supported upon the front and rear wheels 7 and 8. The axles are connected in the ordinary manner by the reach rod or pole 9 having connection with the forwardly extending tongue 10 to which the draft animals are harnessed in the usual manner.

The improved brake consists of a supporting beam 11 rigidly secured by a clip 12 to the rear portion of the reach pole 9 directly in front of the rear wheels 8 and supporting at its opposite terminals the companion depending brackets 13. The supporting beam 11 is connected with the rear axle 8 by brace rods 14 and the lower and rearwardly directed extremities of the brackets 13 are also connected with the rear axle by brace rods 15 which serve to materially strengthen and reinforce the beam and parts carried thereby. Bearing plates 16 are rigidly connected with the depending brackets 13 and support the opposite terminals of a crank shaft 17 provided medially with a depending crank arm 18 and terminally with parallel crank arms 19 extended upwardly and rearwardly with relation to the shaft 17.

The lower terminals of the brackets 13 pivotally support substantially L-shaped links 20 connected at one end by pins 21 with the brackets 13 and at their opposite ends with the brake shoes 22 by pins 23. In their inoperative position the shoes 22 are disposed forwardly of the rear wheels 8 and when in such position the links 20 assume a substantially vertical position whereas when the shoes are moved rearwardly in the direction of the wheels 8 the links 20 assume a rearwardly inclined position with relation to the brackets 13 and as the shoes are brought into contact with the peripheries of the wheels a wedging action is produced which tends to more firmly set the shoes against the wheels and thus effectively retard the travel of the vehicle. The oscillatory movement of the crank shaft 17 is transmitted to the brake shoes through the arms 19 and links 24 pivotally connecting the rear terminals of the arms with the shoes 22 at a point directly above the pivotal connections 23 between said shoes and the upper terminals of the supporting links 20. In order to increase the leverage exerted by the crank arms 19 upon the brake shoes, the crank arms and links 24 are preferably arranged so as to normally occupy widely divergent positions and thus when the brake mechanism is actuated the arms and links are moved substantially into alinement with each other.

A draw rod 25 is mounted for reciprocal movement beneath the reach pole 9 and is connected at its rear terminal with the depending crank arm 18 and at its forward terminal with a chain or other flexible element 26 which permits independent movement of the rear section 25 of the draw rod with relation to the front section 27 thereof incident to the turning movement of the front axle and tongue 10 with relation to the body of the vehicle. The chain section 26 is extended through a guide ring 28 mounted under the front axle 5 and supported in position by laterally extending chains 29 secured at their outer terminals by clips 30 adjacent the terminals of the axle. The end links of the draw chain 26 are connected by a supplementary chain 31 for use in case of breakage of the main chain 26 or in any other emergency.

The rear terminal of the draw rod 27 is hooked as indicated at 32 for selective engagement in the links of the chain 26 whereby the length of the draw rod connections may be varied as required.

The front terminal of the front draw rod section 27 is pivotally connected with the lower terminal of a lever 33 pivotally supported at 34 in a depending bracket 35 secured adjacent the forward terminal of the tongue 10 and connected at its upper end with a yoke attaching member 36 whereby the lever is connected with the yokes of the draft animals.

A hand operable lever 37 is pivotally secured at 38 to the tongue 10 or other preferred part of the vehicle and is provided with a slotted lower terminal 39 slidably receiving the rear portion of the front draw rod section 27. The slotted terminal of the lever is confined between adjustable collars 39 secured in spaced relation upon the rod 27 and adapted to be alternately engaged by the lever 37 during oscillation of the latter. As the arrangement of the arms and links connecting the brake shoes 22 with the draw rod 27 is such that if shoes are applied during the forward movement of said rod it is evident that a corresponding movement of the lower terminal of the lever 37 engages the collar 39 and transmits a forward movement to the draw rod effecting a manual application of the brakes to the extent desired. A releasable locking device 40 associated with a rack segment 41 is provided whereby the lever is locked in various adjusted positions and the rear collar 39 of the draw rod is utilized to coact with the lower terminal of the lever when the upper extremity of the latter is moved forwardly thereby locking the entire brake mechanism against operation as would be desirable when backing the wagon.

The brake shoes 22 are normally retained in forwardly extending or inoperative position by a contractile spring 42 connecting the depending crank arm 18 with the rear axle 6 and normally tending to rotate the shaft 17 in a direction which will exert a forward pull upon the links 24 and brake shoes. However, during the travel of the vehicle down grade its own weight causes a pull to be exerted upon the yoke attached members 36, oscillating the lever 35 and exerting a forward pull upon the draw rod sections 25 and 27 which results in the application of the brake shoes through the arm 18, shaft 17, arms 19 and links 24 and owing to the peculiar inclination of the links 20 the wedging effect above described is produced which increases the pressure exerted by the shoes upon the wheels.

The link 24 at each side of the vehicle is formed in two sections connected by threads whereby the sections may be relatively adjusted to vary the length of the link and thus compensate for wear of the brake shoe incident to prolonged use and, obviously, resulting in an increase in the space between the brake shoe and wheel rim. The sections of the link are secured in a relatively adjusted position by a lock nut.

What I claim is:—

1. A wagon brake including a supporting beam attachable to a wagon, a shaft carried by said beam and provided with crank arms, brake shoes connected with certain of said crank arms, a draw rod connected with another of the crank arms, harness engaging means connected with said draw rod, a hand operable lever connected and movable with relation to said draw rod, and stop members adjustably mounted on the rod and associated with the hand lever whereby the latter may be utilized to apply the brakes or lock the rod and brakes against operation.

2. A vehicle brake including a rock shaft, actuating means connected therewith, crank arms carried by the shaft, movable brake shoes, supporting links connected with the shoes, and links connecting the shoes with the terminals of the arms and normally disposed in comparatively slight angular relation thereto and adapted to move into substantial alinement therewith during application of the shoes whereby to dispose the pivotal connection between the arm and link in line between the pivotal connection between the opposite terminals of the links and the axis of the shaft.

3. A vehicle brake including a supporting beam, brackets attached thereto, supporting links normally disposed in vertical position and pivotally connected at their lower extremities with the brackets, brake shoes pivotally connected with the upper extremities of the links, a rock shaft journaled in said bearings, crank arms carried by the shaft extending in the direction of the brake shoes, and relatively short links connecting the terminals of the arms with the brake shoes and normally disposed in comparatively slight angular relation to the arms and adapted to be moved into alinement therewith during application of the shoes.

4. A vehicle brake including a rock shaft, actuating means connected with said shaft, arms carried by the shaft, movable brake shoes, and adjustable links connecting the shoes with the terminals of the arms and normally disposed in comparatively slight angular relation thereto and adapted to move into substantial alinement therewith during application of the shoes.

5. A vehicle brake including a rock shaft, actuating means connected with the shaft, arms carried by the shaft, movable brake shoes, substantially L-shaped supporting links for the brake shoes, and links connecting the shoes with the terminals of the arms.

6. A vehicle brake including a rock shaft, supporting means therefor, actuating means connected with the rock shaft, arms carried by the shaft, movable brake shoes, brackets carried by the supporting means, links connected with the brackets and supporting the shoes, and links connecting the shoes with the terminals of the arms and normally disposed in comparatively slight angular relation thereto and adapted to move into substantial alinement therewith during application of the shoes, the last mentioned links being adjustable longitudinally thereby to vary the angular relation of the latter to the arms.

In testimony whereof I affix my signature hereto.

HENRY M. FRIESEN.